United States Patent [19]

Hine et al.

[11] Patent Number: 5,265,170

[45] Date of Patent: Nov. 23, 1993

[54] DEVICES AND METHODS FOR READING IDENTIFICATION MARKS ON SEMICONDUCTOR WAFERS

[75] Inventors: Derek L. Hine, Portola Valley; Michael Krolak, Los Gatos, both of Calif.

[73] Assignee: Hine Design, Inc., Palo Alto, Calif.

[21] Appl. No.: 597,082

[22] Filed: Oct. 15, 1990

Related U.S. Application Data

[63] Continuation-in-part of Ser. No. 463,539, Jan. 11, 1990, abandoned.

[51] Int. Cl.⁵ .............................................. G06K 9/00
[52] U.S. Cl. .......................................... 382/8; 382/1;
358/101; 359/382; 359/388
[58] Field of Search ............. 382/8, 1, 65, 48, 28;
358/101, 106; 350/345, 359, 526; 356/338

[56] References Cited

U.S. PATENT DOCUMENTS

| | | | |
|---|---|---|---|
| 4,606,616 | 8/1986 | Parker | 350/521 |
| 4,618,938 | 10/1986 | Sandland et al. | 382/8 |
| 4,687,304 | 8/1987 | Piller et al. | 350/526 |
| 4,845,770 | 7/1989 | Koshida | 382/65 |
| 4,872,052 | 10/1989 | Liudzius et al. | 358/106 |

FOREIGN PATENT DOCUMENTS

0297530 12/1988 European Pat. Off. .
2607288 5/1988 France .

OTHER PUBLICATIONS

Patent Abstracts of Japan, 12 (224), 721, published Jun. 25, 1988, which is an abstract of Japanese Patent Application No. 63/018,209 (NEC Corp) Search Report, EP 91 90 4111, Nov. 19, 1992.
Hine Design Proofreader Trade Brochure, May 1989.

*Primary Examiner*—Joseph Mancuso
*Assistant Examiner*—Yon J. Couso
*Attorney, Agent, or Firm*—Timothy H. P. Richardson

[57] ABSTRACT

Methods and apparatus for machine reading of identification marks incised on semiconductor wafers. Preferred apparatus makes it possible to view the mark either as a dark image on a light background (which is in itself novel) or as a light image on a dark background. Using a television camera and an optical character reader, the viewing method can be changed automatically if a preset confidence level is not reached, and provides a signal if neither method (or the combination of the two methods) gives a satisfactory result. The method is particularly useful for successively reading the identification marks on a number of wafers stacked in a cassette. Preferred apparatus for such reading comprises a wafer support which can be pushed upwards from underneath the cassette so that the wafer to be identified rests on one ledge of the support and the adjacent wafer rests on another higher ledge on the support, thus exposing and precisely locating the identification mark on the first wafer.

19 Claims, 5 Drawing Sheets

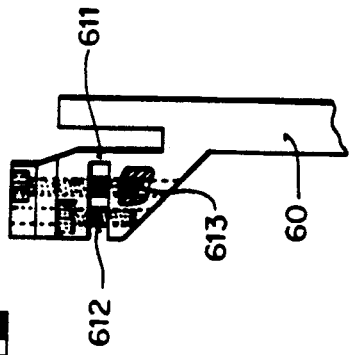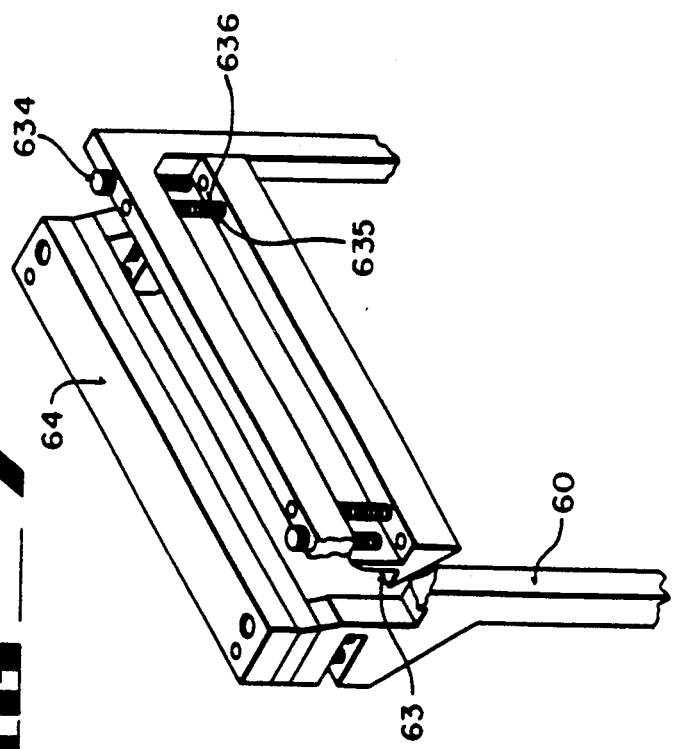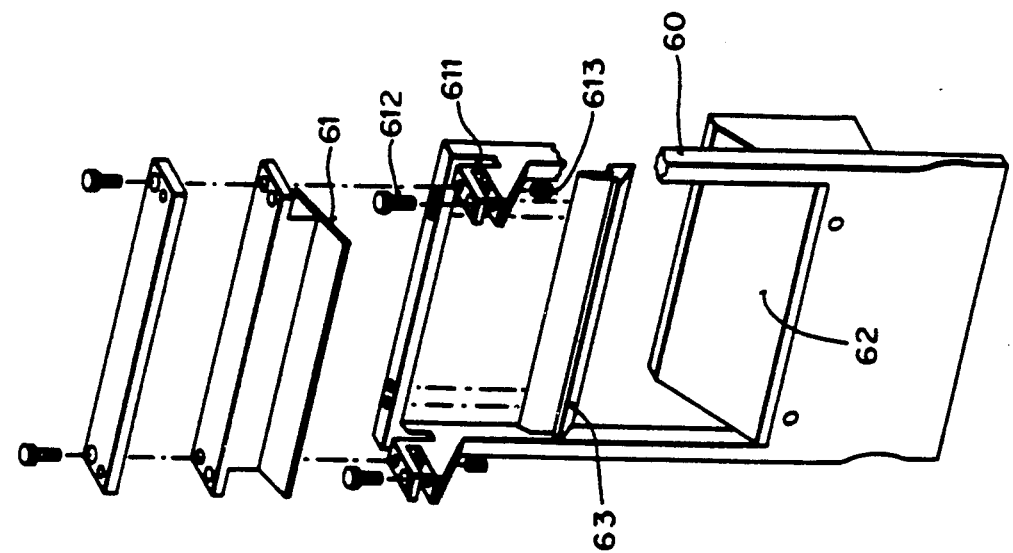

DEVICES AND METHODS FOR READING IDENTIFICATION MARKS ON SEMICONDUCTOR WAFERS

CROSS-REFERENCE TO RELATED APPLICATIONS

This application is a continuation-in-part of our co-pending commonly assigned application Ser. No. 07/463,539 filed Jan. 11, 1990, now abandoned.

BACKGROUND OF THE INVENTION

1. Field of the Invention

This invention relates to methods and apparatus for reading identification marks on semiconductor wafers.

2. Introduction to the Invention

It is important to be able to identify semiconductor wafers (i.e. wafers composed of silicon or other semiconductor material such as gallium arsenide) throughout the different treatments which they undergo before being diced into chips. For this purpose, it is conventional for each wafer to carry an identification mark (usually a unique alpha-numeric mark) at a standard location on one of its principal surfaces, usually adjacent a flat, notch or other identifiable discontinuity formed on the periphery of the wafer so that the orientation of the wafer can be easily determined. Many of the treatments undergone by the wafer after it has been marked involve the deposition of metals or chemicals over the mark. The mark must, therefore, be made by a method which deforms the smooth surface of the wafer, e.g. by means of a laser or a diamond stylus, so that the mark will show through such deposited layers. The term "incised" is used in this specification to denote a mark made by any such method. The marks are very small in size, such that magnification is a practical requirement for reading them, and even though the marks are incised on the wafer, they become more and more difficult to read as the wafer is processed. As a result, the semiconductor industry has not been able to develop a reliable method for machine reading identification marks on wafers. Such a method is highly desirable in order to achieve the objectives of reducing the mis-identification of wafers, increasing production rates, increasing automation, and minimizing handling of the wafers.

SUMMARY OF THE INVENTION

As further described in detail below, we have discovered a number of novel ways for improving the ease and reliability with which identification marks on wafers can be read. These novel expedients can be used, individually or in combination, to achieve some or all of the objectives set out above. The preferred methods and apparatus of the present invention provide, for the first time, a practical method for machine reading the identification marks on semiconductor wafers while the wafers are stacked in the cassettes which are conventionally used to store and transport the wafers between processing steps.

Known methods for reading identification marks on semiconductor wafers involve viewing the mark as a light image on a dark background when viewed by the human eye or by a television camera in its normal (positive) mode. Alternatively, by operating the television camera in its negative mode, the same image can be viewed as a dark image on a light background. In these known methods, the illumination source and the viewing device are arranged so that the light which enters the viewing device is light which has been reflected from the surfaces of the incised mark which lie at an appropriate angle to the illumination source. The surfaces of the wafer which are coplanar with the principal plane of the wafer (i.e. the plane which lies between and is parallel to the two principal surfaces of the wafer), and the surfaces of the incised mark which are not at an appropriate angle to the illumination source, reflect little or no light into the viewing device. The mark appears, therefore, (when viewed positively) as a light image on a dark background. We have realized that on many wafers, particularly as the number of wafer treatments increases, the mark is clearer if it is viewed as an image which, if it is viewed positively (i.e. as a positive image) is a dark image on a light background. In this case, the illumination and the viewing device are arranged so that light reflected from the coplanar surfaces of the wafer does enter the viewing device, and the light which is reflected from the non-coplanar surfaces of the incised mark does not enter the viewing device.

In its first aspect, therefore, this invention provides a method of reading an identification mark incised on a principal surface of a semiconductor wafer which comprises using an illumination system and a video (or television) camera or other viewing device to view the identification mark as an image which, if it is viewed positively, is a dark image on a light background. In its second aspect, this invention provides apparatus for carrying out such a method which comprises (1) a wafer support for supporting a semiconductor wafer in a viewing position;

(2) a viewing device; and (3) a first optical system which can illuminate a target area of a wafer supported by the wafer support so that an identification mark incised on the target area is viewed by the viewing device as an image which, if it is viewed positively, is a dark image on a light background.

We have also realized that by providing apparatus which can be used to view the identification mark either (1) as an image which, if viewed positively, is a light image on a dark background or (2) as an image which, if viewed positively, is a dark image on a light background, it is possible easily to select the most effective viewing method for any particular mark as a whole or for any part of a particular mark. Thus, the apparatus defined above preferably includes (4) a second optical system which can illuminate the same target area of a wafer supported by the wafer support so that an identification mark incised on the target area is viewed by the viewing device as an image which, if viewed positively, is a light image on a dark background.

The methods and apparatus of the invention are preferably operated so that the image of the identification mark is viewed positively, and the invention will be described chiefly by such operation. However, the invention includes also operation so that the image is viewed as a negative image. The apparatus can be equipped with a manual switch for switching on one or the other of the two viewing systems. Alternatively or additionally, the image can be viewed by an optical character reader (OCR) which can be set to reject an image which does not reach a predetermined confidence level. Such an apparatus can be arranged to switch automatically from one viewing system to the other if the confidence level is not reached (including reading one or more of the characters by one system and the other characters by the other system), to proceed if the confidence level is reached in the alternative system, and to stop if the confidence level is not reached in either system (or a combination of both systems).

Any apparatus for viewing the mark alternatively as (1) an image which, when viewed positively, is a dark image or (2) an image which, when viewed positively, is a light image, could be used to gain benefit from the novel concept of using the better of the two images. For example, at one extreme, there could be two completely separate optical systems, each associated with a separate viewing device, with the wafer being in a first position for one system and in a second position for the other system. As a practical matter, however, it is desirable to reduce the number of components as far as possible and for the wafer to be in the same viewing position in both systems. Accordingly, in preferred apparatus, the first optical system includes a first source of light, the second optical system includes a second source of light which is spaced apart from the first source of light, and the target area of a wafer supported by the wafer support can be viewed by the viewing device from the same viewpoint by operating either the first optical system or the second optical system. This preferred apparatus is one in which the first optical system, when the first light is on, (i) causes light from the first light source to strike the target area of a wafer supported by the wafer support, (ii) causes light from the first light source reflected from surfaces of the target area which are coplanar with the principal plane of the wafer to enter the viewing device, and, (iii) causes light from the first light source reflected by an identification mark incised on the target area not to enter the viewing device;

and in which the second optical system, when the second light source is on, (i) causes light from the second source to strike the target area of a wafer supported by the wafer support, (ii) causes light from the second light source reflected from surfaces of the target area which are coplanar with the principal plane not to enter the viewing device, and (iii) causes light from the second light source reflected by an identification mark incised on the target area to enter the viewing device.

Any Optical system can be used to provide the desired image to the viewing device. Preferably, for ease of reading, the image is a direct image, but a mirror image can be used with appropriate recognition techniques. We have obtained excellent results, when using apparatus having two light sources as described above, through the use of apparatus which comprises a first mirror at an angle of about 45° to the principal plane of a wafer supported by the wafer support, and a second mirror;

the light sources and the mirrors being placed so that (i) when the first light source is on and a wafer is supported by the wafer support, light from the first light source strikes the first mirror, is reflected from the first mirror onto the target area of the wafer, and is reflected into the viewing device if it strikes a part of the target area which is coplanar with the principal plane of the wafer, and (ii) when the second light source is on and a wafer is supported by the wafer support, light from the second light source strikes the second mirror, is reflected from the second mirror onto the first mirror, is reflected from the first mirror onto the target area of the wafer, and is not reflected into the viewing device if it strikes a part of the target area which is coplanar with the principal plane of the wafer.

We have used visible light sources and corresponding viewing devices, but light of any wavelength could be used.

In addition to the improved techniques described above for reading the identification mark on an individual wafer, we have also discovered a number of improved techniques for successively reading the identification marks on a plurality of wafers which are stacked in a cassette in the conventional way. These techniques are useful with any reading method, though they are particularly useful in combination with the novel reading techniques described above.

A conventional cassette contains a plurality of uniformly spaced slots, each slot having an upper access end, side members and a partially open bottom end. The wafers are stacked in the slots, each wafer generally having its flat, notch or other peripheral discontinuity at the bottom end or, less commonly, at the top end. The techniques which we have discovered are useful for cassettes containing wafers whose identification marks are at the bottom ends of the slots or which can be rotated so that their identification marks are at the bottom ends of the slots. We have discovered that by making use of a wafer support which is thin enough to fit in between the first and fourth wafers (or the second and fifth, or third and sixth, etc. wafers), and which has on it two bearing surfaces which are offset from each other both in a plane coplanar with the principal planes of the wafers and in a plane at right angles to the planes of the wafers, it is possible to push the wafer support into the cassette so that one of the bearing surfaces contacts one wafer and displaces it by a relatively large amount, and the other bearing surface contacts the adjacent wafer and displaces it by a relatively small amount, so that said adjacent wafer is precisely located in relation to the wafer support and the identification mark thereon can be viewed, making use of the space created by displacing the other wafer by a relatively large amount. After the identification mark has been read, the wafer support is retracted, moved to the next wafer, and the procedure repeated. It is of course necessary that the wafer support should also be such that it will clear the ends of the cassette when reading the marks on the end wafers.

Another aspect of the invention, therefore, provides an apparatus for successively reading identification marks incised on a plurality of semiconductor wafers, the wafers being in a cassette containing a plurality of slots; each of the slots having an upper access end, side members, and a partially open bottom end; and each of the wafers being in one of the slots and having an identification mark incised on a principal plane of the wafer, the mark being on the portion of the wafer which is at the bottom end of the slot, which apparatus comprises (1) a cassette support for supporting the cassette; and (2) a wafer support which (a) has a first bearing surface and a second bearing surface, (b) is mounted adjacent to the cassette support so that when a cassette is supported by the cassette support, the wafer support is adjacent to the partially open bottom ends of the slots in the cassette;

(c) can be moved relative to the cassette support, along an axis substantially at right angles to a plane which is coplanar with the principal planes of wafers in a cassette supported by the cassette support, through a plurality of potential viewing positions, each of the potential viewing positions corresponding to one of the wafers; and (d) in each of the potential viewing positions, can be moved relative to the cassette support in a plane which is substantially coplanar with the principal planes of wafers in a cassette supported by the cassette support, between (a) a rest position in which the support does not contact any of the wafers in a cassette supported by the cassette support, and (b) an operating position in which the wafer support can support a wafer in a viewing position in which a target area of the wafer bearing can be viewed, the first bearing surface and the second bearing surface being spaced apart so that, as the wafer support is moved from the rest position to the operating position, when a cassette of wafers is supported by the cassette support with a first wafer in the path of the first bearing surface and an adjacent second wafer in the path of the second bearing surface, the second bearing surface contacts the second wafer and the first bearing surface subsequently contacts the first wafer, whereby the second wafer is pushed into a remote position and the first wafer is pushed into the viewing position.

As indicated above, the apparatus is particularly useful when the identification marks and associated peripheral discontinuities of the wafers are at the bottom ends of the slot. If they are not, then the apparatus must include means for rotating the wafers so as to bring the identification mark into the target area (as described for example in International Patent Application No. PCT/US88/01728 and U.S. Pat. No. 4,892,455, the disclosures of which are incorporated herein by reference). Even when the wafers are placed in the cassette so that the peripheral discontinuities are at the bottom ends of the slot, they may not be in precisely the desired alignment. It is, therefore, preferred that the first bearing surface should be such that the discontinuity becomes precisely located in relation to the first bearing surface when the wafer is in the viewing position. For example, if the discontinuity is a flat, the bearing surface is preferably planar, so that the wafer will, if the flat is not already parallel to the bearing surface, rotate as it is pushed into the viewing position so that the flat is parallel to the bearing surface. Similarly, when the discontinuity is a notch, the bearing surface can have a notch locator at the center thereof.

The cassette of wafers can be in any orientation, providing that measures are taken to ensure that the wafers are maintained in the stacked position until displaced by the wafer support and returned to the stacked position when the wafer support is withdrawn. Preferably the cassette is oriented so that this is achieved by the force of gravity alone. It is also preferred that when a wafer is in the viewing position, it should contact a known surface of the cassette, so that its position is precisely known. Accordingly, it is preferred that the cassette support is such that, when a cassette of wafers is supported by the cassette support, the principal planes of the wafers are inclined to the vertical at an angle of 5° to 45°, e.g. about 15°.

Any method can be used to view the identification mark on the first wafer which is thus exposed in the viewing position. It is preferred, however, to make use of an apparatus which comprises (a) a viewing device, (b) a first mirror which is mounted on the wafer support so that, when the wafer support is in the operating position and there is a wafer supported by the wafer support in the viewing position, the first mirror lies in a plane which is at an angle of about 45° to the principal plane of the wafer; and (c) a second mirror which is mounted on the wafer support so that light which is reflected from the target area of the wafer into the first mirror is reflected by the first mirror into the second mirror, and is reflected by the second mirror into the viewing device.

The first mirror is necessarily very small, in order that it can fit into the confined space between the wafers. The precise angular relationship between the first mirror and the wafer is, therefore, very important, and the apparatus preferably includes means for changing the angle between the first mirror and a wafer in the viewing position. It is also desirable that the apparatus should comprise a first bearing surface adjustment means for changing the position of the first bearing surface.

We have found that the angle of the first mirror, the location and angle of the second mirror, and the location and viewing direction of the camera or other viewing device are preferably such that the light which enters the viewing device leaves the target area of the wafer at an angle of 65° to 80° to the principal plane of the wafer.

BRIEF DESCRIPTION OF THE DRAWING

The invention is illustrated in the accompanying drawings, in which

FIG. 2 is a partial diagrammatic side view of the same apparatus showing the light path when the second light source is on;

FIG. 3 is a partial diagrammatic top view of the same apparatus showing the light path when the second light source is on;

FIG. 4 is a diagrammatic side view of the same apparatus showing the light path when the first light source is on; and FIGS. 5, 6 and 7 are isometric views of the wafer support in FIG. 1.

DETAILED DESCRIPTION OF THE INVENTION

Figure 1:
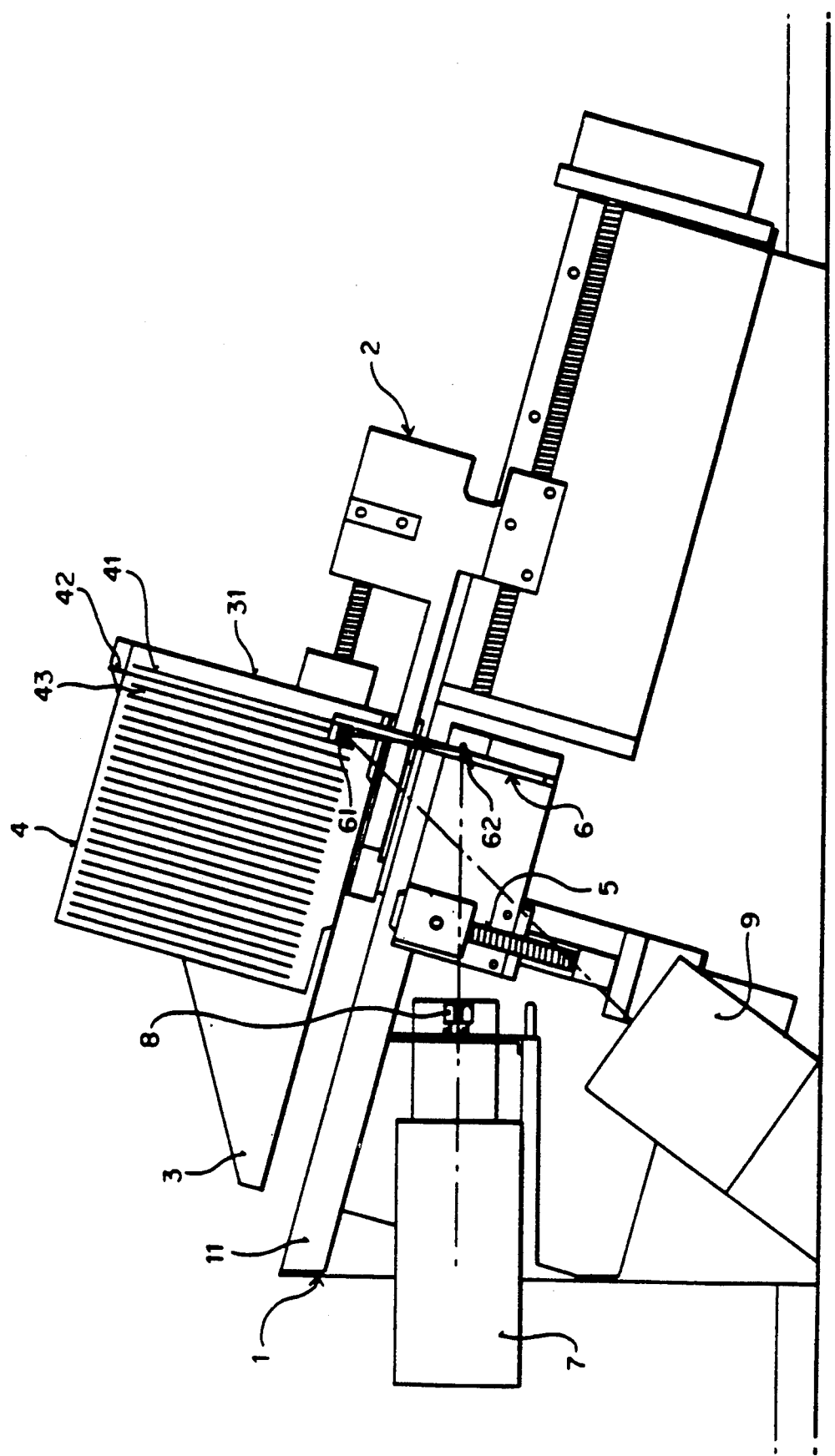
FIG. 1 is a diagrammatic side view of a preferred apparatus of the invention.
Figure 2:
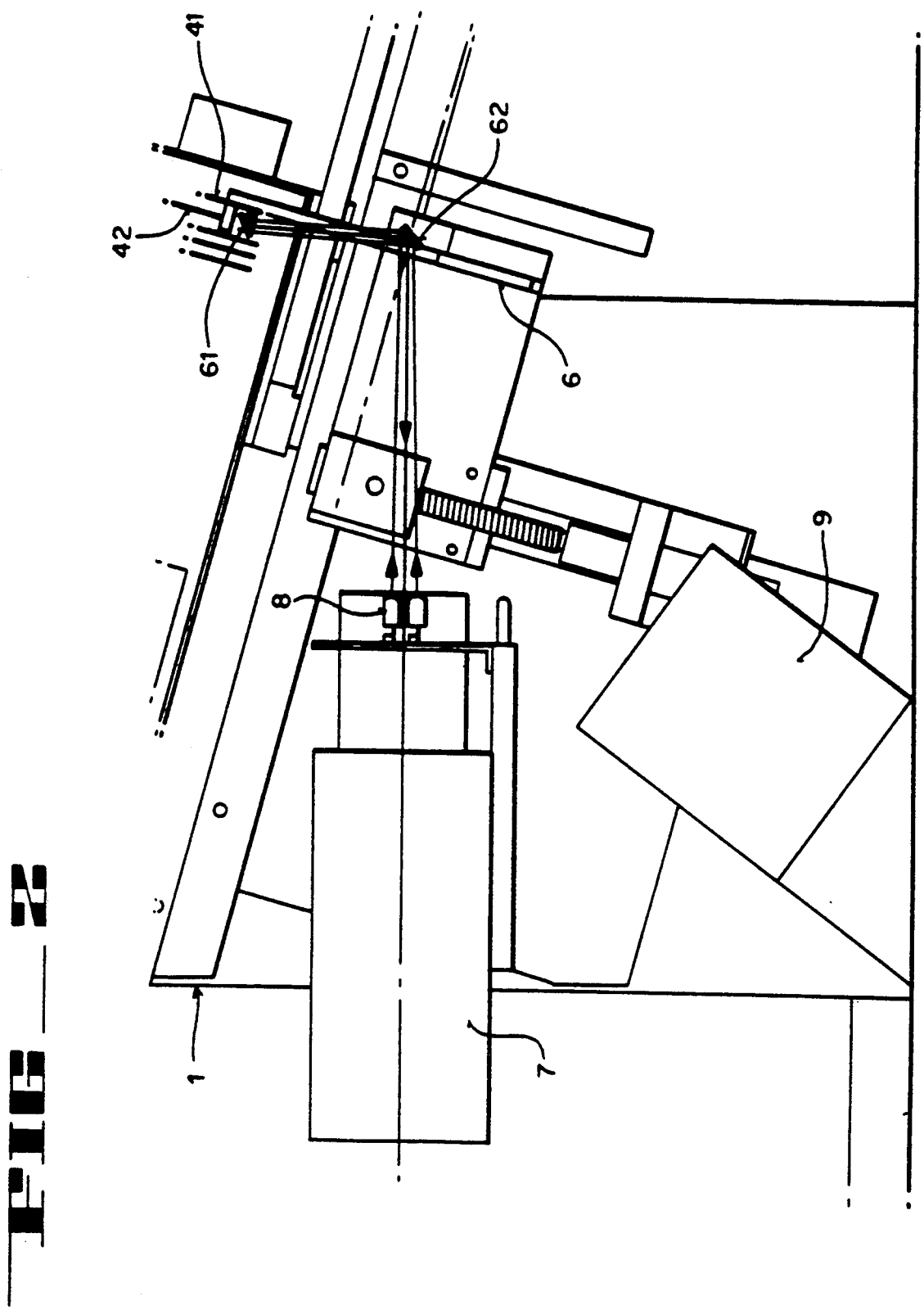
Figure 3:
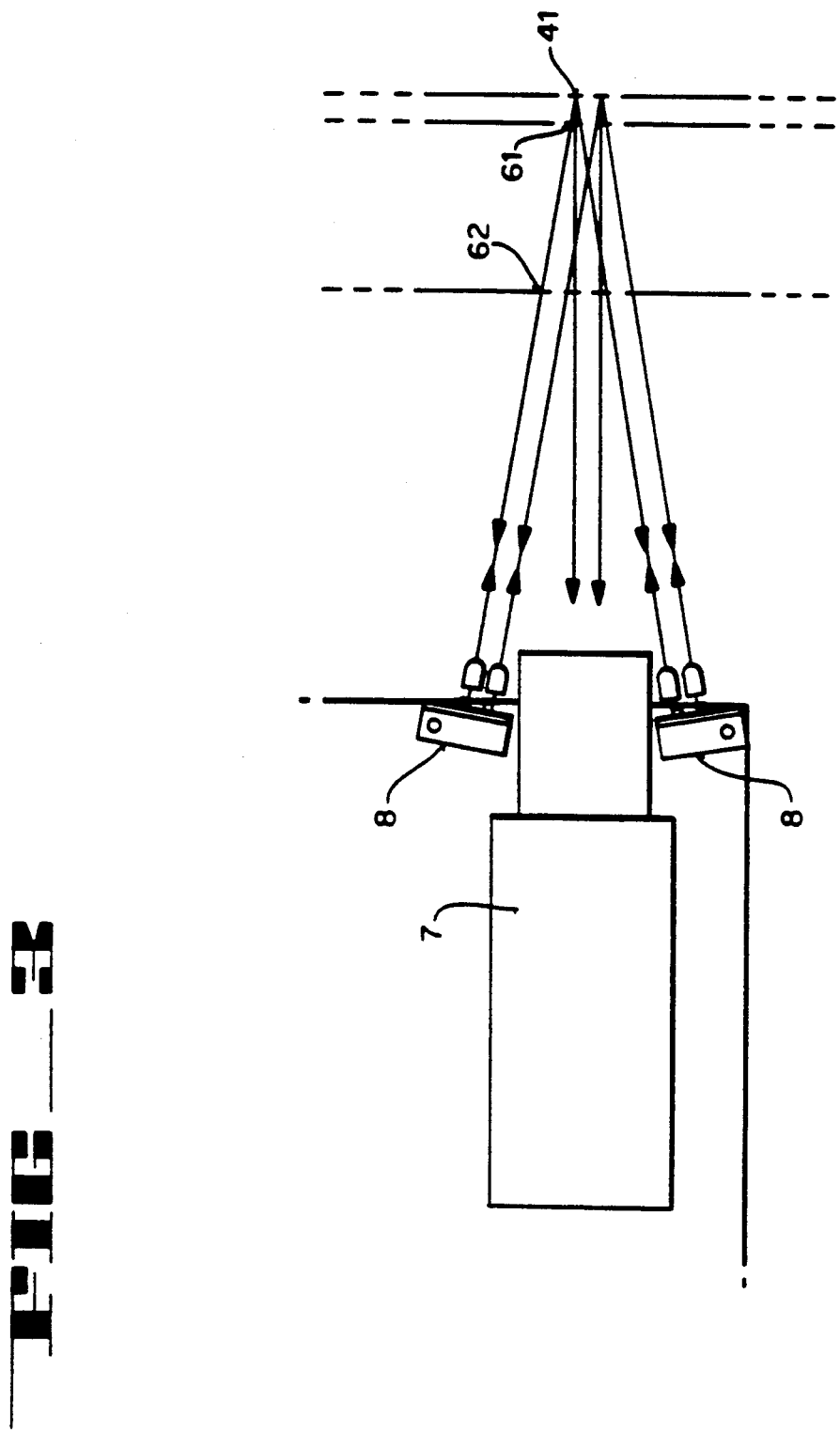
Figure 4:
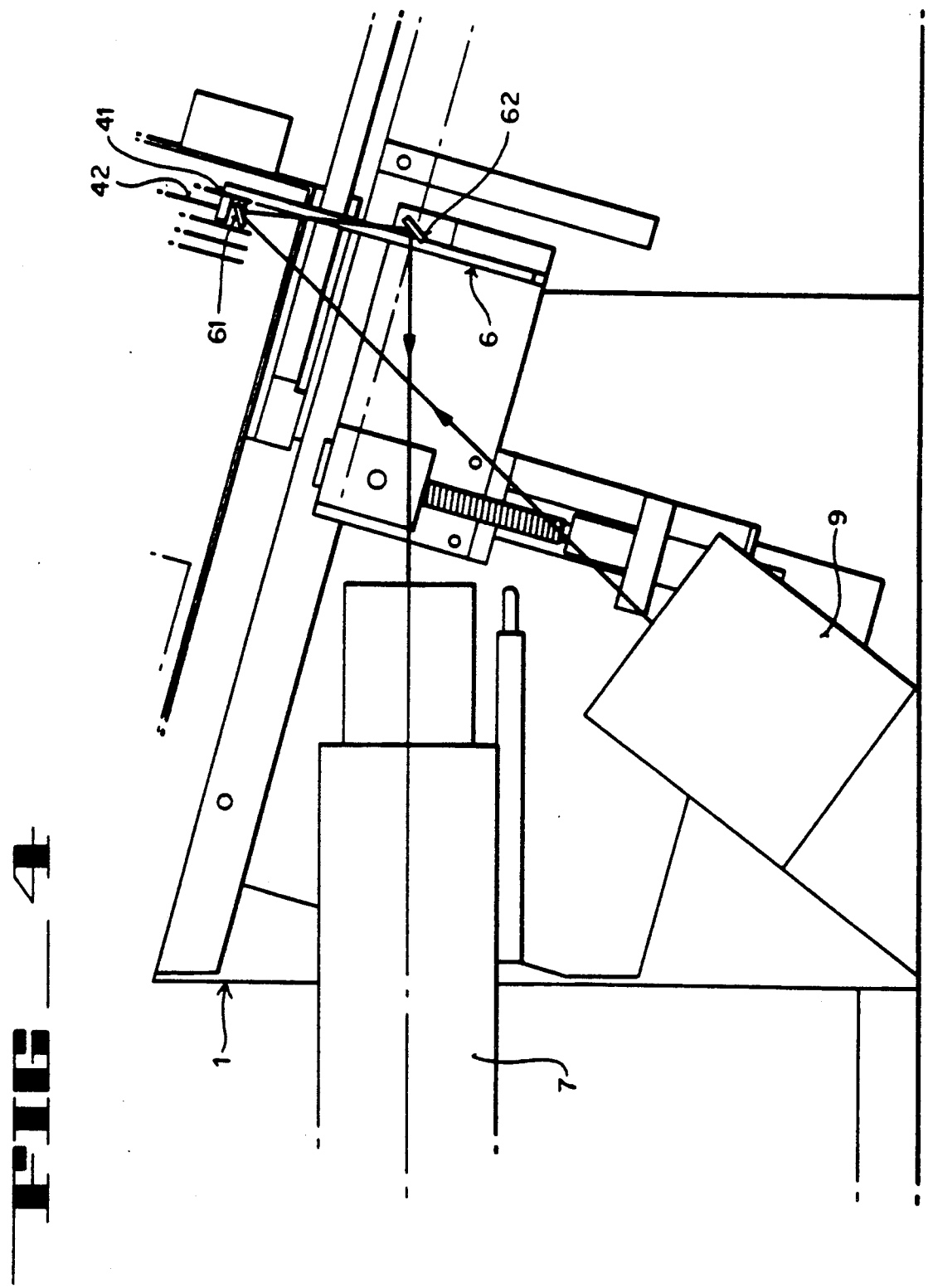

A preferred apparatus of the invention will now be described by reference to the accompanying drawings. It is to be understood, however, that although this description will refer to individual features of the apparatus or methods of using the apparatus in the context of the apparatus as a whole, the present disclosure includes the use of such individual features in combinations other than those explicitly disclosed, either with each other, or with features previously referred to (whether as part of the present invention or as part of the prior art), or with features known to (or suggested by this specification to) those skilled in the technologies of semiconductor wafers, mechanical engineering, optical viewing systems (including displays) and optical character recognition (including automatic processing techniques associated therewith).

Referring now to the drawings, a frame 1 having a horizontal base has a sloping upper surface 11. Mounted on the upper surface via an indexing mechanism 2 is a cassette support 3 which supports a cassette 4 in which are stacked silicon wafers 41, 42, 43 . . . etc. The principal planes of the wafers are at an angle of about 15° to the vertical, and the cassette presses against lower end wall 31 of the cassette support. Also mounted on the frame 1, via an elevator 5, is a wafer support 6. The wafer support can be raised and lowered by the elevator between a lower rest position in which it is below the wafers, and an upper operating position (shown). The elevator speed can be controlled in a cyclical manner so as to minimize the speed of the wafer support when it first contacts the wafers, in order to reduce the danger of damaging the wafers or creating particulate debris. Also mounted on the frame is a television camera 7, a second light source 8 comprising a plurality of light emitting diodes mounted on opposite sides of the camera, and a first light source 9 which is a white light source. Light emitting diodes have a wavelength which we have found to be particularly appropriate for use as the second light source.

As best shown in FIGS. 5, 6 and 7, the wafer support includes a frame 60 having a first mirror 61 mounted at its upper end at an angle of about 45° to the frame via a thin metal flexure member 611 which enable the angle of the mirror to be adjusted by means of screws 612 and to be fixed by set screw 613. A second mirror 62 is mounted on the center part of the frame 6. Also attached to the upper end of the frame 6 is a ledge 63 which provides the bearing surface for the wafer whose identification mark is to be viewed (i.e. the first bearing surface referred to above). The height of the ledge 63 can be adjusted by means of screws 634 which hold the ledge to the frame and which compress springs 635 surrounding guide pins 636. The upper surface of the frame 6 provides the second bearing surface 64 for the wafer which is to be pushed out of the way so that the first wafer can be viewed.

At least the interior surfaces of the apparatus are preferably treated, e.g. painted matt black, so as to minimize stray reflections.

We claim:

1. Apparatus for reading an identification mark incised on a principal surface of a semi-conductor wafer having a principal plane, which apparatus comprises
   (1) a wafer support for supporting a semi-conductor wafer in a viewing position;
   (2) a viewing device;
   (3) a first optical system which (i) includes a first source of light and (ii) can illuminate a target area of a wafer supported by the wafer support so that an identification mark incised on the target area is viewed by the viewing device from a viewpoint as an image which, if it is viewed positively, is a dark image on a light background;
   (4) a second optical system which (i) can be used as an alternative to the first optical system, (ii) includes a second source of light which is spaced apart from the first source of light, and (iii) can illuminate the same target area of a wafer supported by the wafer support so that an identification mark incised on the target area is viewed by the viewing device, from the same viewpoint as when the first optical system is used, as an image which, if it is viewed positively, is a light image on a dark background; and
   (5) means for switching between the first optical system and the second optical system, said means consisting of means which turns on one of the first and second sources of light and turns off the other of the first and second source of light;

whereby, when a wafer having an identification mark incised thereon is supported by the wafer support with the identification mark in the target area, the viewing device can view the identification mark alternatively as (a) an image which, if it is viewed positively, is a dark image on a light background by operating the first optical system or (b) as an image which, if it is viewed positively, is a light image on a dark background by operating the second optical system, and the viewing device can be switched between alternatives (a) and (b) merely by turning on one of the first and second light sources and turning off the other.

2. Apparatus according to claim 1 wherein all the light which enters the viewing device, when the first system is operated and when the second system is operated, leaves the target area of the wafer at an angle of 65° to 80° to the principal plane of the wafer.

3. Apparatus according to claim 1 wherein the first light source is a white light, and the second light source is a plurality of light emitting diodes.

4. Apparatus according to claim 1 wherein the viewing device is a camera.

5. Apparatus for reading an identification mark incised on a principal surface of a semiconductor wafer having a principal plane, which apparatus comprises
   (1) a wafer support for supporting a semi-conductor wafer in a viewing position;
   (2) a viewing device;
   (3) a first optical system which (i) includes a first source of light and (ii) can illuminate a target area of a wafer supported by the wafer support so that an identification mark incised on the target area is viewed by the viewing device from a viewpoint as an image which, if it is viewed positively, is a dark image on a light background; and
   (4) a second optical system which (i) can be used as an alternative to the first optical system, (ii) includes a second source of light which is spaced apart from the first source of light, and (iii) can illuminate the same target area of a wafer supported by the wafer supported so that an identification mark incised on the target area is viewed by the viewing device, from the same viewpoint as when the first optical system is used, as an image which, if it is viewed positively, is a light image on a dark background;

whereby, when a wafer having an identification mark incised thereon is supported by the wafer support with the identification mark in the target area, the viewing device can view the identification mark alternatively as an image which, if it is viewed positively, is a dark image on a light background by operating the first optical system or as an image which, if it is viewed positively, is a light image on a dark background by operating the second optical system, said apparatus comprising a first mirror at an angle of about 45° to the principal plane of a wafer supported by the wafer support, and a second mirror;

the first and second sources of light and the first and second mirrors being placed so that (i) when the first light source is on and a wafer is supported by the wafer support, light from the first light source strikes the first mirror, is reflected from the first mirror onto the target area of the wafer, and is reflected into the viewing device if it strikes a part of the target area which is coplanar with the principal plane of the wafer, and (ii) when the second light source is on and a wafer is supported by the wafer support, light from the second light source strikes the second mirror, is reflected from the second mirror onto the first mirror, is reflected from the first mirror onto the target area of the wafer, and is not reflected into the viewing device if it strikes a part of the target area which is coplanar with the principal plane of the wafer.

6. Apparatus according to claim 5 wherein light which enters the viewing device leaves the target area of the wafer at an angle of 65° to 80° to the principal plane of the wafer.

7. Apparatus according to claim 1 which comprises a manual switch for switching on either the first light source or the second light source.

8. Apparatus according to claim 1 which comprises feed means for successively feeding onto the wafer support each one of a plurality of semi-conductor wafers, whereby the identification marks on each of the wafers can be viewed successively.

9. Apparatus according to claim 8 wherein the feed means comprises a cassette support for supporting a cassette containing a plurality of parallel semi-conductor wafers, each of the wafers being in a stacked position, the cassette support and the wafer support being movable relative to each other, along an axis substantially at right angles to a plane which is coplanar with the principal planes of the wafers through a plurality of potential viewing positions, each of the potential viewing positions corresponding to one of the wafers, whereby, when a cassette containing a plurality of semiconductor wafers is supported by the cassette support, the cassette support can be moved relative to the wafer support successively through the potential viewing positions, and in each potential viewing position the corresponding wafer can be supported by the wafer support and the target area of the wafer can be viewed.

10. Apparatus according to claim 9 wherein at each of the potential viewing positions, the wafer support and the cassette support can be moved relative to each other, in a plane which is substantially coplanar with the principal planes of the wafers in a cassette which is supported by the cassette support, between (a) a rest position in which, when a cassette of wafers is supported by the cassette support, the support does not contact any of the wafers in the cassette, and (b) an operating position in which when a cassette of wafers is supported by the cassette support, the wafer support supports a wafer in a viewing position in which the target area of the wafer can be viewed.

11. Apparatus according to claim 10 wherein the wafer support comprises a first bearing surface and a second bearing surface which is spaced apart from the first bearing surface so that, as the wafer support is moved from the rest position to the operating position, when a cassette of wafers is supported by the cassette support with a first wafer in the path of the first bearing surface and an adjacent second wafer in the path of the second bearing surface, the second bearing surface contacts the second wafer and the first bearing surface subsequently contacts the first wafer, whereby the second wafer is pushed into a remote position and the first wafer is pushed into the viewing position.

12. Apparatus according to claim 11 wherein the first bearing surface is such that when the first wafer has a discontinuity along its periphery in the region contacted by the first bearing surface, the discontinuity is precisely located in relation to the first bearing surface when the first wafer is in the viewing position.

13. Apparatus according to claim 11 wherein the cassette support is such that, when a cassette of wafers is supported by the cassette support, the principal planes of the wafers are inclined to the horizontal at an angle such that (a) when the first wafer is pushed into the viewing position, it leans, under the force of gravity alone, against a known surface of the cassette, and (b) when the wafer support is moved from the operating position to the rest position, each of the first and second wafers drops back into its stacked position under the force of gravity alone.

14. Apparatus according to claim 13 wherein the cassette support is such that, when a cassette of wafers is supported by the cassette support, the principal planes of the wafers are inclined to the vertical at an angle of 10° to 20°.

15. Apparatus according to claim 11 which comprises a first mirror adjustment means for changing the angle between the first mirror and a wafer in the viewing position, and a first bearing surface adjustment means for changing the position of the first bearing surface.

16. Apparatus according to claim 1 wherein the viewing device is a television camera and which comprises a display unit which shows the image viewed by the television camera when it views the target area of a wafer supported by the wafer support.

17. Apparatus according to claim 1 which comprises an optical character reader which reads the image viewed by the viewing device.

18. Apparatus according to claim 19 which provides a signal when the optical character reader is unable to read the identification mark with a predetermined degree of confidence.

19. Apparatus according to claim 18 which automatically switches from the first optical system to the second optical system or vice versa when the optical character reader is unable to read the identification mark with a predetermined degree of confidence.

* * * * *